Oct. 27, 1936.   G. W. BOOTH   2,058,404
PROCESS AND APPARATUS FOR THE MANUFACTURE OF DISK BLANKS
Filed May 4, 1932   3 Sheets-Sheet 1
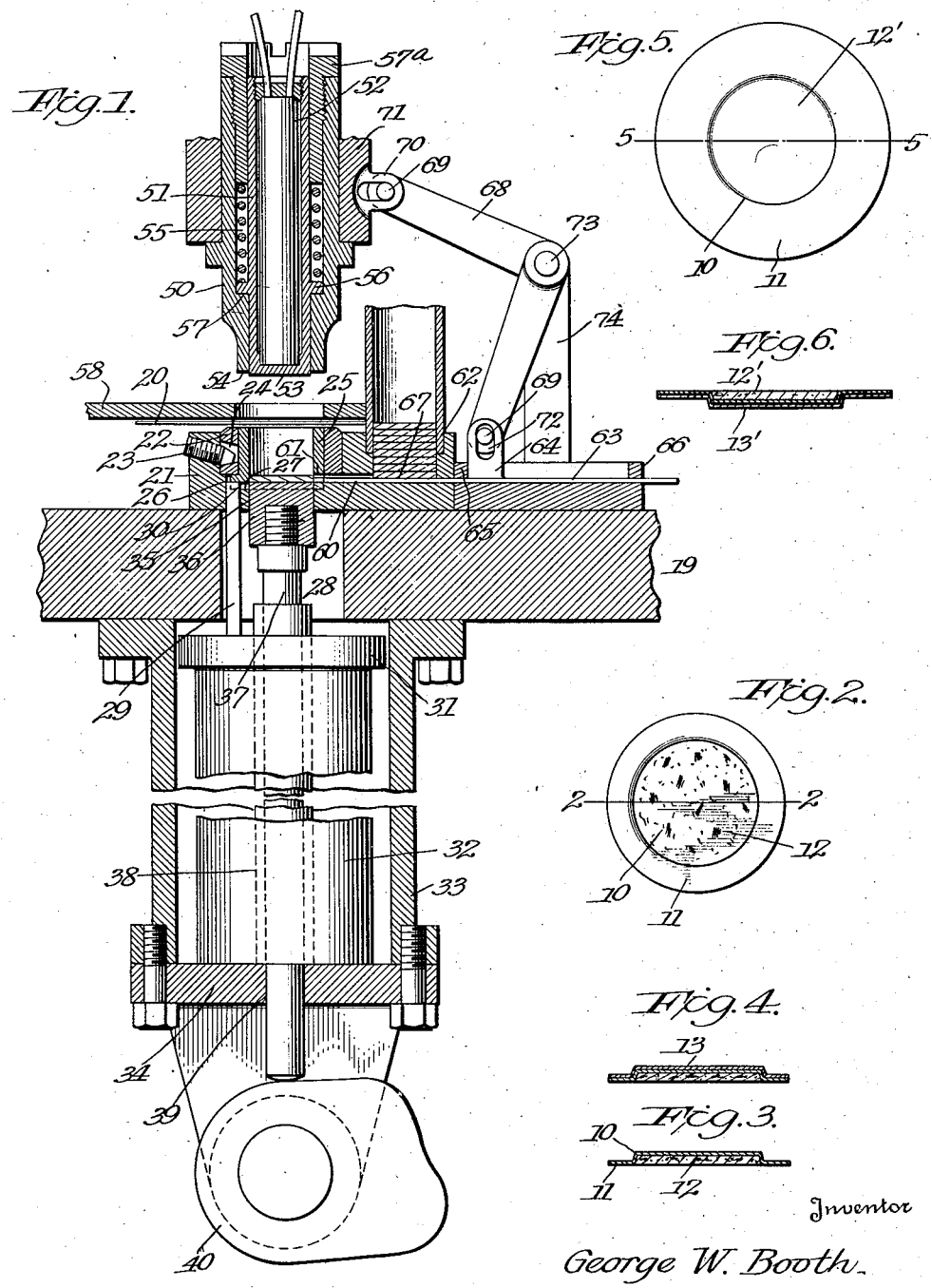
Inventor
George W. Booth

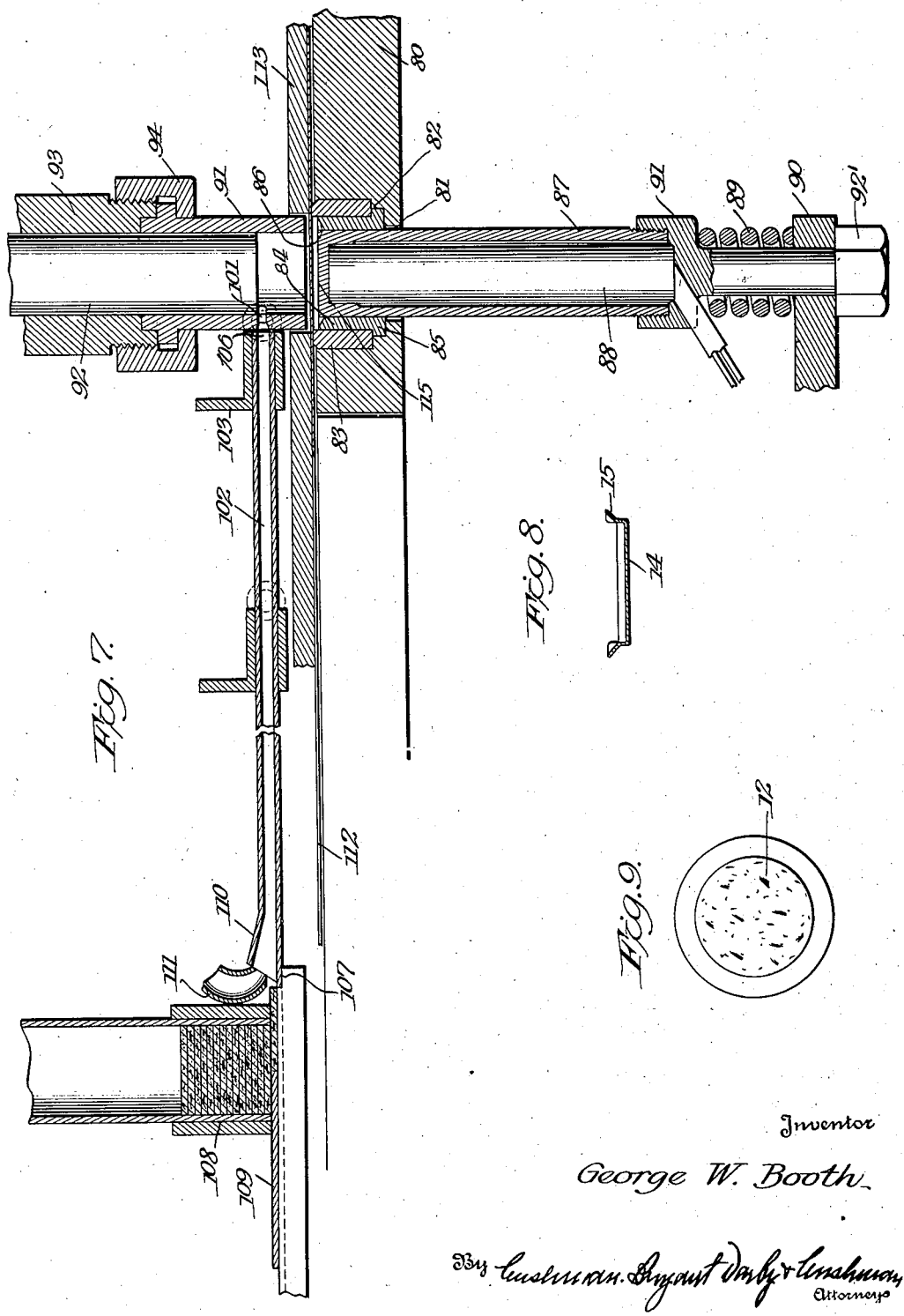

Oct. 27, 1936.                G. W. BOOTH                2,058,404
          PROCESS AND APPARATUS FOR THE MANUFACTURE OF DISK BLANKS
                     Filed May 4, 1932           3 Sheets-Sheet 3
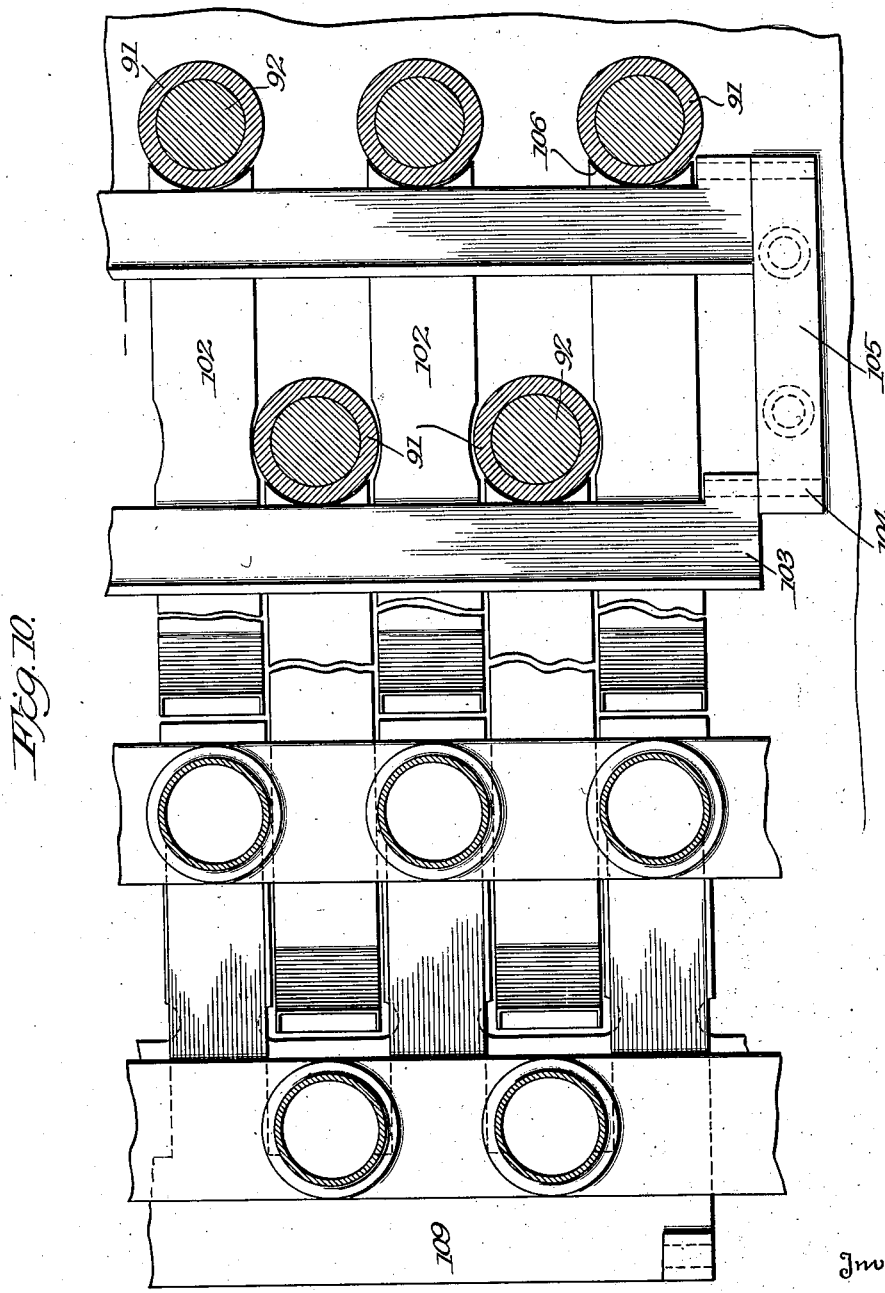
Inventor
George W. Booth Patented Oct. 27, 1936

2,058,404

UNITED STATES PATENT OFFICE 2,058,404

PROCESS AND APPARATUS FOR THE MANUFACTURE OF DISK BLANKS

George W. Booth, Baltimore, Md., assignor to Crown Cork & Seal Company, Inc., Baltimore, Md., a corporation of New York Application May 4, 1932, Serial No. 609,325

15 Claims. (Cl. 113—80)

My invention relates to a method of manufacturing caps, that is, conventional crowns and shells as set forth in my copending applications, Serial Nos. 553,462 and 553,464, filed July 27, 1931, and the joint application of Booth, Dennis and Goebel, Serial No. 553,463, filed July 27, 1931, and the joint application of McManus and Booth, Serial No. 539,930, filed January 30, 1932, with which are usually associated a sealing liner.

Heretofore, caps have been manufactured (1) by forming the shells or crowns as one operation and transferring them to a second machine where the liner is positioned and applied, and (2) by preliminarily affixing a plurality of liners to a blank as one step, and then feeding the prepared composite blank to a separate apparatus for forming the cap.

With either of these prior methods satisfactory results are attainable, but the expense of using two segregated steps, with accompanying separate apparatus on the one hand, and the resultant lengthening of production time on the other, is objectionable particularly with an article of this character which is manufactured in tremendous quantities.

In the art of applying closures to bottles it has been proposed to form the closure or cap of a bottle from sheet material by cutting a disk from the sheet material and drawing or molding the disk to the form of the exterior of the bottle mouth. In other words, a cap is formed directly upon the bottle from blank sheet material. Such a method is impractical in actual use since it subjects the bottle to undesirable pressure and strain and also because it requires that the filled bottle be handled to an extent which would be altogether impossible in the case of most liquids, and particularly beverage liquids.

Another objection to the last mentioned process results from the fact that in such a process, the original sheet material comprises two layers, the upper layer being of metal and the lower layer being of liner material. When the blank disks are cut from the sheet, the layer of liner materials is of the same area as the layer of metal. The result is that the liner material extends down about the mouth of the bottle beneath the portion of the metal sheet which is molded to grip the bead about the exterior of the bottle. So far as any sealing action is concerned, it is usually entirely unnecessary to have the liner material extend down beneath the gripping portion of the cap and the presence of liner material at this point may decrease the gripping action which can be obtained.

From a practical standpoint, therefore, it is considerably more advantageous to form the lining of the cap from a preformed liner which will not extend beneath the gripping portion of the cap and to form the entire cap as a separate and distinct article of manufacture instead of upon a container.

The object of the present invention is to avoid the use of separate steps by producing, as a distinct and separate article of manufacture, a complete assembled cap having a preformed liner or insert positioned in or affixed thereto, in a single manufacturing operation. That is to say, the cap is produced from strip or sheet material on a punching and drawing machine, and substantially simultaneously with or, as a part of such operation, a liner or insert is positioned in assembled relation with or adhesively united to the cap.

Broadly, therefore, the invention involves the production, as a separate or distinct article of manufacture, of a cap comprising a shell and a liner and the combining of the shell or cap with a preformed liner or insert, and contemplates the combining operation substantially simultaneously with the forming of the shell. That is to say, the liner is assembled or united with the shell in situ, or substantially at the point of the forming operation. In other words, the shell is formed, and at the point of formation, or substantially in the vertical plane thereof, the liner is assembled or united therewith.

Particularly characteristic, therefore, of this invention, is the fact that the cap is formed as a distinct and separate article of manufacture and involves the use of a preformed liner, also, that the union of the liner or insert with the metal cap is affected either simultaneously with the forming operation (i. e., punching and drawing), or instantaneously following the same.

The punching and drawing are accomplished on a single machine as a continuous operation, i. e., as substantially instantaneously consecutive steps and in the same vertical plane.

In one form of the invention, the affixing or positioning of the liner or insert to the cap is carried out during both the punching and drawing operation; and in another embodiment during the drawing operation.

The liners or inserts are fed to the machine in timed relation with the feed of the metal strip material, and the cap is formed about the liner or insert.

The bonding of the cap and liner is accomplished preferably by means of a suitable pressure sensitive or heat fusible adhesive.

Referring to the drawings:

Figure 1 is a sectional view of one embodiment of the invention.

Figure 2 is a bottom view of one of the assembled shells.

Figures 3 and 4 are sections of such shells, Figure 3 being a section on the line 2—2 of Figure 2, and Figure 4 a modificaton.

Figure 5 is a top view of a shell which may be constructed by my method and apparatus and which will carry an advertising insert.

Figure 6 is a section on the line 5—5 of Figure 5.

Figure 7 is a sectional view of another apparatus.

Figure 8 is a view of a crown shell produced by the construction of Figure 7.

Figure 9 is a bottom view of the shell of Figure 8, and

Figure 10 is a plan view showing the arrangement where a plurality of the constructions shown in Figure 7 are employed.

Referring to the drawings, Figures 2, 3 and 4 illustrate a metal shell having a central circular depression 10 and a substantially straight peripheral flange or edge 11. The liner 12 is preferably adhesively united to the shell and disposed in the central depression 10, being likewise preferably substantially circular.

In Figure 4, the cap has a decorative or protective facing of lacquer or paper 13, the latter being adhesively joined to the shell.

In Figures 5 and 6, the cap is substantially similar to that shown in Figure 4, except that the central depression extends downwardly from the flange instead of upwardly therefrom, i. e., the insert 12' bears a suitable indicia and is positioned on the exposed top surface of the cap, as distinguished from the sealing liners 12. On its undersurface the cap of Figures 5 and 6 has a protective coating 13', such as a coating of lacquer, bonded layer of paper, or composition material.

In Figures 8 and 9, the cap is in the form of the conventional crown 14, having an expanded serrated skirt 15 and liner 12.

Each of the various caps illustrated and described in my aforesaid applications, and those shown in the drawings hereof, as well as conventional caps, may be formed by the method now to be explained, and upon either of the apparatus of Figures 1 and 7.

The strip or sheet material 20, from which the caps are formed, will be preferably of metal, although paper or composition material, capable of being formed into caps and retaining its shape, will be used. This strip material will preferably carry a bonded layer of heat fusible or pressure sensitive adhesive on one surface and/or a decorative or protective coating or layer 13, 13' on the other surface.

Likewise, the liners may similarly carry the adhesive instead of the strip material, and in the case of the insert 12', have a decorative surface or one provided with identifying or advertising indicia.

These liners are preferably preformed and composed of cork, paper, rubber, or suitable composition material, as understood in the art.

Briefly, the strip material and liners are fed in timed relation to the punching and drawing machine; the cap is formed over the liner; and simultaneous with the forming, i. e., (1) during the punching and drawing operation (2) during the drawing operation, or (3) immediately subsequently thereto, the liner or insert is adhesively united to the cap or positioned in assembled relation thereto. In other words, the assembled and complete cap is produced in situ.

With the method of this invention a more perfect cap is produced by the single operation, because with segregated steps the shell is (1) subject to distortion in its transfer from the forming machine to the liner assembly machine, as for example, through jamming (2) an increased opportunity to collect deleterious matter, i. e., dust is presented, and (3) this latter is fundamentally objectionable and, moreover, will interfere with obtaining adequate adhesion of the liner to the cap.

Again, where the liners are preliminarily affixed to blank material, this initial step and that of transferring the composite blank materials to the forming machine affords increased possibilities for collecting dust and other deleterious matter. Moreover, the forming operation is subject to the most exacting conditions, since the punches and dies are arranged in batteries, because failure of the punches and dies to properly register in the slightest with the spaced liners results in (1) defective caps, (2) stopping the machine, and (3) discarding all of the composite blank material of the particular batch.

Referring to Figures 1, 7 and 10, the apparatus is disposed in a vertical plane and the operating parts move in a vertical plane slightly inclined to the horizontal, whereby the caps, as formed, are precipitated by gravity to a conveyor and carried to the packing and shipping station.

The machines are arranged in batteries, the disclosures in Figures 1 and 7 being detail views, and that of Figure 10 being representative of the operation and arrangement of a battery.

The construction illustrated in Figure 1 is a single acting punch press, wherein 19 is a suitable bolster plate rigidly supporting a die shoe 21. The shoe is recessed to snugly receive a circular fixed cutting die 22 which is additionally held against rotative and axial movement by a stud or screw 23 having a bevelled end engaging the bevelled wall of a recess 24 in die 22.

Disposed concentrically within the fixed die and supported for axial movement therein is the drawing die or ring 25, the upper edge of which is normally flush with the edge of the fixed cutting die 22 and the lower edge of which is provided with a flange 26 engaging the undersurface of the fixed die forming a stop shoulder to limit upward axial movement of the drawing die, as will be described.

The shoe is recessed at 27 to permit downward movement of the ring for the desired extent and regulate the draw, i. e., the depth of the central depression in the cap.

Normally the shoe 21, cutting die 22 and drawing die are in the position shown in Figure 1, and the means for supporting the ring 25 for axial movement will now be set forth.

The bolster is provided with an opening 28, and passing freely through said opening and projecting slidably through an opening in the bottom wall of the recess in the die shoe, is a rod or stem 29. One or more of such stems may be employed, and at the upper end engage and support the drawing die, as shown at 30. At the lower end, the rods are received in a plate 31 supported on a resilient bumper 32 of rubber, or in the form of a spring. The bumper is housed in a casing 33 and normally compressed between the bottom wall 34 of the casing on which the bumper rests and the stop shoulder 26 on the drawing ring, with which the stem or stems 29 engage, whereby the stop shoulder normally is pressed against the under surface of the die 22, and the drawing ring is resiliently supported. The housing is preferably cylindrical and the plate 31 of similar contour, whereby the compressibility and rebound of the bumper are guided vertically.

Coincident with the opening in the drawing ring is an opening 35 in the die shoe, and mounted for reciprocatory movement in said openings, is an anvil 36. In Figure 1, the anvil is shown at the limit of its downward movement, and it is adapted to be moved upwardly to a position where a liner carried on its upper surface will be disposed substantially flush with the exposed faces of the cutting die and drawing ring.

The means for operating the anvil, i. e., giving it a reciprocatory motion, comprise a stem 37 having threaded engagement with the anvil, as shown. This stem extends through a sleeve 38 disposed concentrically within the bumper member and through an opening 39 in the bottom wall of the casing, whereby the stem or plunger is properly guided for vertical axial movement. The stem 39 engages a suitable operating cam 40 at its lower end, as shown. This cam is so formed that in the lowermost and uppermost positions of the anvil, there will occur a dwell whereby the anvil will be held substantially fixed for the necessary periods of time required, either to feed a liner to the anvil, or form the cap over over the liner upon the anvil. This will be described more in detail hereinafter.

The construction so far explained constitutes the female portion of the machine.

Cooperating with these parts is a cutting punch 50. The cutting punch 50 has its body portion connected to a suitable reciprocating member operated by a prime mover and the reciprocation of the cutting punch and the reciprocating of the anvil are timed, so that they both advance toward the operating faces of fixed die 22 and drawing die 25 substantially simultaneously.

The cutting punch 50 has resiliently and slidably mounted substantially concentrically therein the member 51 which has a variety of purposes, i. e., (1) it carries the electrical heating element 52, (2) it constitutes a die member in opposed relation to the anvil, (3) it serves as a stripper for the formed assembled caps, and (4) it activates a heat fusible or heat coagulable adhesive, or a pressure sensitive adhesive on the metal strip material or liner.

The member 51 is normally projected so that its circular exposed face 53 extends beyond the circular face 54 of the cutting punch, as shown.
This construction and the resilient mounting of the member are accomplished through the use of a spring 55, the tension of which is regulated by the engagement of the spring at its lower end with a projection 56 on member 51 and at its upper end with a nut 57a threaded into the body portion of the cutting punch. In this manner the member 51 is normally urged to the position shown with the projection 56 in contact with the shoulder 57 on the interior of the cutting punch, and the face 53 in advance of the effective face of the cutting punch.

The above described parts constitute the male punch and die, and are adapted to cooperate with the anvil and female members.

The metal sheet material is fed beneath a stripper plate 58 supported on the bolster frame in working position with relation to the male and female sections of the machine, and is supported on the drawing and cutting dies, and simultaneously, with the feeding, the preformed liners are propelled to position on the anvil, the anvil being in its lowermost position and the cutting punch in its highest retracted position during the feeding operation.

The feeding means for the sheet material will be conventional in structure, and the propelling means for the liners will now be set forth.

A passageway 60 is formed in the die shoe which is coincident with a recess 61 in the flanged periphery of the drawing ring. This passageway communicates with the vertical opening in the drawing die or ring and is arranged to be flush with the face of the anvil in its lowermost position.

The passageway is of a size to permit liners to be propelled to the anvil from a liner chute 62, by means of a feed plate 63 which is reciprocated in the passageway.

The feed plate has a lug 64 thereon which engages a stop 65 to limit the forward movement of the plate, so that its end will be flush with the inner vertical wall of the drawing die, this wall serving as a guide to assure proper positioning of the liner on the anvil.

The rearward movement of the plate is limited by engagement of lug 64 with stop 66, when the end of the plate is moved past the mouth 67 of the feed chute to allow the liner column to fall and dispose a liner in position to be engaged by the plate. Since the passageway is of a height to receive a single liner, the forward movement of feed plate 63 will propel a liner to the anvil, the remainder of the column being supported on the plate.

The feed plate is moved forward to propel a liner when the male punch and die are retracted, and is returned past the mouth of the chute when these members descend and the anvil ascends.

This is accomplished by means of a bell crank 68 having a pin 69 at one end engaging in a laterally extending slotted lug 70 on a sleeve 71, which is fixed to the body portion of the cutting punch and reciprocates therewith. The other end of the bell crank has similar connection with a slot 72 in the lug 64 on the feed plate.

The bell crank is pivotally supported at 73 on a standard 74 mounted on the bolster.

The method of forming the completed assembled caps will now be described, it being understood that the operation is continuous and enables rapid production of a multitude of caps.

The metal strip material having an adhesive lower surface is fed into working relation with the punching and forming members and a liner or insert is simultaneously propelled to position on the anvil, whereupon the cutting punch and heating member descend and the anvil ascends.
The heated face 53 of the resiliently supported member 51 and the liner on the anvil contact with the strip on opposite sides in registering relation. Substantially instantaneously thereafter, the cutting punch 50, in cooperation with cutting die 22, severs a circular disc of metal from the strip. The anvil remains fixed by reason of the dwell provided by the cam and simultaneously with the stamping action of the cutting punch and die, the opposed circular working faces of the cutting punch and drawing ring engage the peripheral margin of the disk upon opposite sides in registering relation and the face 53 of member 51 is compressed upwardly against the action of its spring. The cutting punch continues to descend about the anvil and presses the ring downwardly against the action of the bumper, and with it the confined margin of the disk, a distance equal to or less than the depth of recess 27 and further compressing member 51. The disk is thus drawn over the liner on the fixed anvil or die to produce a shell having a circular cup-shaped depression, the margin being frictionally held between the plane surfaces of the cutting punch and drawing die, without pinching or straining of the metal, to form a straight peripheral flange.

During the entire operation, it is to be noted that the heated face 53 contacts with the upper face or exposed surface of the bottom of the depression, the lower surface being supported by the liner on the anvil.

In this manner, the liner is compressed against the disk within the area defining the depression and in proper assembled relation, and the heat fusible adhesive on the disk is rendered active to bond the parts together.

The initial operation, that is, the engagement of the heated face 53 on one side and the liner on the other side of the strip, does not ordinarily produce an adhesive union between the two, but the face 53 heats the metal and renders the adhesive tacky. During the punching, the adhesive is further rendered active and a partial or incomplete adhesion is obtained. The adhering or binding is completed during (1) the drawing operation, and (2) the drawing operation and during the return of the parts to normal position, or (3) during the return of the parts to normal position. It will, therefore, be seen that the complete assembled cap is formed in situ, or, in other words, in the same vertical plane.

As hereinbefore stated, the punching and drawing steps are substantially instantaneously consecutive, and by regulating the temperature of the electrical heating element 52, the heat will not deleteriously affect the parts of the machine while, at the same time, the liner can be assembled with the cap and bonded thereto within a relatively short time period.

At the completion of the drawing operation, the parts are timed, so that the anvil descends concurrently with the ascent of the cutting punch.

The heated face 53, however, being spring projected and hence compressed in the lowermost position of the cutting punch remains in contact with the assembled cap during the retraction of the punch and the return upward movement of the drawing ring which carries the cap. This engagement of the face 53 with the upper exposed face of the depressed portion of the cap will continue until a height is reached where the member 51 has its shoulder 56 projected against the stop 57. Thus, the liner is cemented to the shell during retraction of the parts, and this contact may be availed of to complete the bonding in cooperation with the drawing operation, or, as the sole means of securing an adhesive union of the shell and liner. Where the bonding is completed or solely accomplished during return movement of the parts, it is, of course, understood that the liner, being frictionally held in the depressed portion of the cap, will not have a tendency to drop or disengage itself, so that the face 53 will act upon the adhesive in a thoroughly satisfactory manner.

The spring pressed member 51 will also act as a stripper member to separate the cap from the cutting punch, and this stripping action will take place immediately after the cutting punch is disengaged from the drawing ring.

The ascent of the cutting punch permits the drawing ring likewise to correspondingly ascend with the flange of the cap frictionally held between the opposed faces of the cutting punch and resiliently supported drawing ring, whereby the shape of the assembled cap is maintained without possibility of distortion while the heated face 53 is in contact therewith.

The drawing ring 25, when it assumes its normal position, will also act as a stripper and eject the cap from the cutting die 22.

Since, as stated, the operating parts move in a vertical plane slightly inclined to the horizontal, the ejected caps fall by gravity upon a suitable conveyor from whence they are transferred to the packaging and shipping station.

The downward movement of the cutting punch having retracted the feed plate, its upward movement will cause the feed plate to feed a liner to the anvil, this operation being timed to take place when the cutting punch has reached the limit of upward movement and the anvil has reached the limit of downward movement. Whereupon the operations described will continue.

With a pressure sensitive adhesive, the heating element 52 will be deenergized or omitted.

As heretofore stated, the adhesive may be on the liner or on the strip material.

Also, an adhesive need not be employed, and the liner frictionally united to the shell by contact with the wall of the depression, the heating element being likewise deenergized or omitted.

A crown shell, as shown in Figures 8 and 9, may be formed by the method and apparatus just described utilizing, of course, dies of the proper contour.

It will be observed that the forming of the shell and assembly of the liner therewith is accomplished in situ. In other words, the cap is completed in a single operation at the point of formation or in the vertical plane thereof.

Also, the assembly of the liner with the shell may take place while the shell is formed, i. e., punching and drawing operation, or instantaneously following the same.

Referring to Figure 7, I have illustrated a double acting press in which the method of producing the cap is substantially similar to that previously described, except that the union of the cap and liner is accomplished (1) during the drawing operation (2) during the drawing operation and return of the parts to normal position, or (3) during the return of the parts to normal position, i. e., after the cap has been punched and formed. As with the method just described, the assembled caps are formed in situ, as a single operation and in the same vertical plane.

This machine and method may be practiced for making caps of the type illustrated in Figures 2 to 6, and is shown in connection with the production of crown caps for purposes of illustration.

The fixed bolster plate is indicated at 80 and has an opening 81 therethrough provided with a stepped wall 82. The cutting die 83 is swaged or fixed in said wall and the drawing die 84 is concentrically disposed within the cutting die, having at its lower end a shoulder 85 upon which the lower end of the cutting die bears to retain the drawing die in position. The operating face of the cutting die extends beyond the plane of the working face of the drawing die, and this latter is shown as provided with a serrated face 86 to form a crimped crown shell, although the serrations on the drawing ring may be omitted and the ring formed with a plane or any desired face according to the type of cap to be produced.

A resiliently mounted member 87 constituting an anvil and stripper has axial movement in the opening in the drawing ring and bolster plate and carries an electrical heating element 88.

The working or anvil face of this member 87 is normally disposed or resiliently supported flush with the working face of the drawing die as shown, through the medium of a coil spring 89 confined at one end by the plate 90 and acting on an enlargement 91 associated with the anvil at the opposite end, whereby the anvil is resiliently supported for axial movement.

The anvil is threaded into the enlargement which has a reduced stem extending through the plate and to which a nut 92' is attached forming a stop and limiting upward movement of the anvil under pressure of the spring to bring the anvil or working face into the position shown.

The male members of the press comprise a cutting punch 91 and an indenting punch 92 axially movable therein. The punches are each carried in a suitable holder 93 to which the cutting punch is connected by a nut 94 and this holder is operated by any suitable cam mechanism, not shown, for reciprocatory motion. The indenting punch is likewise operated by a suitable cam mechanism, not shown, for reciprocatory motion.

Under actual conditions, a battery of presses will be employed, wherein a plurality of holders will be mounted in a reciprocating head operated by a cam mechanism, and a suitable cam mechanism will be provided for operating the associated indenting punches in the proper sequence with respect to the cutting punches.

Referring to Figure 7, the cutting punch at its lower end is provided with an opening or passageway 101 of a size to pass a liner into the longitudinal opening in the cutting punch and adapted to communicate with this passageway is a feed chute 102.

The feed chutes, as shown in Figure 10, are supported by brackets or angle irons 103 which, at their ends, are pivotally supported at 104 in blocks 105 connected to and movable with the reciprocating head.

Each feed chute has a longitudinal opening therethrough of a size to pass a liner and the mouth 106 is arcuate conforming to the entrant portion of passageway 101.

The other end of the chute is freely and slidably supported on a base at 107, whereby the chutes may be raised and lowered by the movement of the head.

A liner feed tube 108 is supported on the base, and cooperating therewith is a reciprocating plate 109 acting to feed the liners one at a time into the adjacent open end 110 of the chute 102. This end is flared as shown and a suitable blower 111 communicates with the flared portion to propel a liner, moved in advance of the blower by plate 109, through the chute and opening 101.

The strip material 112 is fed between the stripper plate 113 and the bolster plate to position in working relation to the press.

In the operation of the machine the head is moved down by the cam mechanism from its upper limit of movement, carrying with it the cutting punch which moves in advance of the indenting punch, and the chute 102 which assumes the position shown in Figure 7 at one point in the downward movement of the head and cutting punch. When the chute 102 and opening 101 are in alignment the plate 109 positions the liner before the blower which propels it through the chute and opening into the longitudinal opening in the cutting punch. At this point also, the working face of the cutting punch is but slightly above the surface of the metal strip material, so that the liner falling or dropping in the longitudinal opening cannot become freed and hence move out of aligned position. The cutting punch continues to move downwardly until it engages the cutting die 83 to punch out a disk, whereupon, the dwell on the cam causes the punch to remain stationary with the marginal edge of the disk held frictionally between the opposed working faces of the cutting punch 91 and the drawing die 85. The liner having dropped to a position upon the surface of the strip material is confined by the cutting punch 91 in a position above and aligned with the disk. Substantially immediately after the liner enters the opening in the cutting punch, the indenting punch 92 is moved downwardly within and through the cutting punch past the working face thereof, and engages the upper surface of the liner which rests on the disk and which in turn has its margin supported between the opposed working faces of the cutting punch and drawing die, and its central portion supported on the resiliently mounted anvil 87. The continued downward movement of the indenting punch draws the metal to produce a central depression therein and forces the anvil downwardly against the tension of its spring.

The downward movement of the indenting punch is regulated so as to control the draw and produce a cap having a central depression of a required depth. The heated working face 115 of the anvil is in engagement with the outer surface of the cap during the entire drawing operation, and since the liner is compressed against the cap by the indenting punch on one side and the spring pressed anvil on the other, an adequate bonding is obtained. During the drawing operation, of course, the marginal edge of the disk is retained between the working faces of the cutting punch and drawing die and the central depression, as stated, is drawn or produced by the action of the indenting punch which depresses the resiliently supported anvil.

At the end of the cam cycle, the cutting and indenting punches ascend as does the anvil 87 and during this ascent, it will be noted that the anvil has its heated surface 115 continuously in contact with the under surface of the cap so as to act upon the adhesive and form a perfect bond between the liner and cap. At the upper limit of its movement, the anvil will serve to eject the cap, which, by reason of the inclination of the machine, will fall by gravity to a suitable conveyor. Likewise, the cutting punch 91 will strip a cap from the indenting punch.

It will, therefore, be seen that a complete assembled cap is formed as a single operation, that is, in situ or in the same vertical plane of operation. The bonding of the cap and liner will take place during the drawing operation, as well as during the return of the punches and anvil to retracted position. In some cases, I will rely solely upon the contact of the heating member with the cap during its retracting movement to accomplish the bonding so that the bonding takes place immediately subsequent to the forming operation.

The stripper plate 113 acts as a guide for the strip material and assures that the disks will be cleanly stripped from the metal.

In the practical construction, the blower, liner feed plate and strip material are fed in timed relation with the head so that a multiplicity of caps can be formed and the production time period materially decreased.

In the construction illustrated in Figures 7 and 10, it will be noted that initially the punched disk having a liner superposed thereon and guided by the wall of the punching die is in contact with the heating member 88, whereby the adhesive will be rendered tacky, and that thereafter this contact is maintained during both the drawing operation and the retraction of the parts. As stated, this permits the liner to be assembled with the cap during the forming operation or after the cap is formed and, in this connection, the temperature of the heating element as well as the time period can be controlled in accordance with the adhesive so that the final product ejected from the machine is a perfect article.

While I have referred to a heat fusible adhesive, it will be understood that either the sheet material or the liner material may have a coating of a pressure sensitive adhesive, and due to the pressure exerted by the opposed faces of the indenting punch and anvil, a very effective bonding of the cap and liner is produced.

A cap produced in accordance with the methods illustrated and described in connection with Figures 1 and 7 may have the liner frictionally combined, in that since the cap is formed over the liner, the opposed walls of the liner and depression will frictionally engage, and the liner may be held in the cap without the use of an adhesive.

In each of the methods outlined, the assembled cap is produced as a single operation, that is, the liner may be united to the cap during the forming of the cap or immediately subsequent thereto. In this manner, the cap and liner are united in situ without the necessity of operations upon separate machines, since the cap is formed and the liner united thereto in the same vertical plane of operation.

I claim:

1. The process of forming as a distinct article of manufacture, a cap consisting of a shell and a liner adhesively united thereto by a heat sensitive adhesive which comprises forming a shell, and adhesively uniting a preformed liner and shell by the application of heat during the forming operation.

2. The process of forming, as a distinct article of manufacture, a cap consisting of a shell and a liner adhesively united thereto, which comprises feeding the shell material and a preformed liner, the former having a heat fusible adhesive coating on one side thereof, to a punching and forming machine, and simultaneously punching and forming a shell while adhesively uniting the liner thereto by applying heat to the opposite side of the shell.

3. The process of forming, as a distinct article of manufacture, a cap consisting of a shell and a liner adhesively united thereto, which comprises feeding the shell material and the liner material, the former having a heat fusible adhesive coating on one side thereof, to a punching and forming machine, and simultaneously punching and forming a shell while adhesively uniting a preformed liner thereto by applying heat to the opposite side of the shell throughout the punching and forming operation.

4. The process of forming as a distinct article of manufacture, a cap consisting of a shell and a liner adhesively united thereto, which consists in assembling a liner with a shell blank and with an adhesive interposed therebetween, substantially simultaneously forming the shell in situ, and applying heat to the shell and liner during the formation of the shell from the shell blank.

5. The process of forming as a distinct article of manufacture, a cap consisting of a shell and a liner adhesively united thereto, which consists in assembling a liner with a shell blank and with an adhesive interposed therebetween, substantially simultaneously forming the shell, and adhering the shell and liner by applying heat and pressure to the assembled unit during the formation of the shell from the shell blank.

6. The process of forming as a distinct article of manufacture a cap consisting of a shell and a liner adhesively united thereto by an adhesive, which consists in punching a shell blank from sheet metal having a heat sensitive adhesive thereon, assembling a liner with the shell blank and with the heat sensitive adhesive interposed therebetween, substantially simultaneously forming the shell, and adhering the shell and liner by the application of heat and pressure during the formation of the shell from the shell blank.

7. The process of forming as a distinct article of manufacture, a cap consisting of a shell and a liner adhesively united thereto by a heat sensitive adhesive, which consists in punching a shell blank from sheet metal having a heat sensitive adhesive thereon, assembling a liner with the shell blank and with the heat sensitive adhesive interposed therebetween, substantially simultaneously forming the shell, and adhering the shell and liner by the application of heat and pressure during the formation of the shell from the shell blank.

8. The process of forming as a distinct article of manufacture, a cap consisting of a shell and a liner adhesively united thereto which consists in assembling a liner with a shell blank, one of the same having a heat sensitive adhesive thereon, substantially simultaneously forming the shell, and adhering the shell and liner by the application of heat and pressure during the formation of the shell from the shell blank.

9. The process of forming as a distinct article of manufacture, a cap consisting of a shell and a liner adhesively united thereto by an adhesive which consists in assembling a liner with a shell blank, one of the same having a heat sensitive adhesive thereon, substantially simultaneously forming the shell, and adhering the shell and liner by the application of heat and pressure during the formation of the shell from the shell blank.

10. The process of forming as a distinct article of manufacture, a cap consisting of a shell and a liner adhesively united thereto by an adhesive which consists in assembling the liner with a shell blank, the latter having a heat sensitive adhesive thereon, substantially simultaneously forming in situ the shell with the liner therein, and applying heat and pressure in situ in the shell and liner.

11. In an apparatus for forming in a single and continuous operation a cap having a shell and a liner with an adhesive interposed therebetween, comprising a pair of coacting die members for forming the cap shell with a depressed central portion and an outwardly extending peripheral flange portion, means for maintaining one of said portions in a fixed position relative to the movement of the other during the forming operation, means for depositing a cushion liner in said shell substantially as the latter is formed, and heating means associated with one of the die members for adhesively uniting the liner to the central portion of the cap shell.

12. In an apparatus for forming in a single and continuous operation a cap having a shell and a liner with an adhesive interposed therebetween, a pair of coacting die members for forming the cap shell with a depressed central portion and an outwardly extending peripheral flange portion, means for moving the flange portion relative to the depressed portion during the forming operation, means for depositing a cushion liner in said shell substantially as the latter is formed, and heat and pressure means associated with one of said die members for adhesively uniting the liner to the central portion of the cap shell.

13. An apparatus for forming caps having a shell and a liner with an adhesive interposed therebetween, comprising dies for punching and forming a shell blank with a depressed central portion and an outwardly extending flange portion, means for depositing a cushion liner in said shell substantially simultaneously with the formation of the shell, and means for activating a heat sensitive adhesive carried by one of the cap parts to adhesively unite the liner to the central depressed portion of the cap shell during the forming operation.

14. The process of forming as a distinct article of manufacture, a cap consisting of a shell and a liner adhesively united thereto, which comprises punching from sheet material a shell blank and forming a shell therefrom, and substantially simultaneously with the forming operation inserting a liner in said shell with an adhesive interposed between the shell and liner, and adhesively uniting the shell and liner by applying heat to the shell during the formation of the shell from the shell blank.

15. The process of forming as a distinct article of manufacture a cap consisting of a shell and a liner united thereto by an adhesive, which consists in assembling a liner with a shell blank and with an adhesive interposed therebetween, by cutting the shell blank from sheet material, and a substantially simultaneously adhesively uniting the shell and liner during said cutting operation and the formation of the shell from the shell blank by the application of pressure in the forming operation.

GEORGE W. BOOTH.